(12) United States Patent
Chang et al.

(10) Patent No.: US 7,727,975 B2
(45) Date of Patent: Jun. 1, 2010

(54) PECTIN-MODIFIED RESISTANT STARCH, A COMPOSITION CONTAINING THE SAME AND METHOD FOR PREPARING RESISTANT STARCH

(75) Inventors: Wei-Hsien Chang, Hsinchu (TW);
Jiing-Yang Wu, Hsinchu (TW);
Chin-Hung Chang, Hsinchu (TW);
Yi-Shan Cheng, Hsinchu (TW)

(73) Assignee: Food Industry Research and Development Institute, Hsinchu (TW)

( * ) Notice: Subject to any disclaimer, the term of this patent is extended or adjusted under 35 U.S.C. 154(b) by 411 days.

(21) Appl. No.: 11/983,142

(22) Filed: Nov. 7, 2007

(65) Prior Publication Data

US 2009/0118231 A1    May 7, 2009

(51) Int. Cl.
*A61K 31/718* (2006.01)
*A61K 31/732* (2006.01)
*A61K 31/738* (2006.01)

(52) U.S. Cl. .............................. 514/54; 514/60; 536/124
(58) Field of Classification Search ........................ None
See application file for complete search history.

(56) References Cited

U.S. PATENT DOCUMENTS

| | | | |
|---|---|---|---|
| 6,623,943 B2 | 9/2003 | Schmiedel et al. | |
| 6,670,470 B1 | 12/2003 | Ketola et al. | |
| 6,890,571 B2 | 5/2005 | Shi et al. | |
| 2007/0196437 A1* | 8/2007 | Hamaker et al. | 424/439 |

OTHER PUBLICATIONS

Khondkar, D., et al. "Rheological behaviour of uncross-linked and cross-linked gelatinised waxy maize starch with pectin gels." *Food Hydrocolloids, Elsevier* (2007)vol. 21, No. 8, pp. 1296-1301.
Bajpai, A.K., et al. "Studies on [alpha]-amylase induced degradation of binary polymeric blends of crosslinked starch and pectin." *Journal of Materials Science: Mater Med* (2007) vol. 18, No. 5, pp. 765-777.
Woo, K.S., et al. "Cross-Linked Resistant Starch: Preparation and Properties." *Cereal Chemistry* (2002) vol. 79, No. 6, pp. 819-825.
Han, J., et al. "Preparation and physical characteristics of slowly digesting modified food starches." *Carbohydrate Polymers* (2007) vol. 67, No. 3, pp. 366-374.
Hou, W., et al. "Pectinesterase-Catalyzed Firming Effects during Precooking of Vegetables." *Journal of Food Biochemistry* (1996) vol. 20, No. 5, pp. 397-416.
Fry, Stephen C. "Cross-Linking of Matrix Polymers in the Growing Cell Walls of Angiosperms." *Annual Reviews Plant Physiol.* (1986) vol. 37, pp. 165-186.
Englyst, H. N., et al. "Classification and measurement of nutritionally important starch fractions." *European Journal of Clinical Nutrition* (1992) 46 (Suppl. 2) pp. S33-S50.
Van Buren, J.P. "Function of Pectin in Plant Tissue Structure and Firmness." in *The Chemistry and Technology of Pectin*, Academic Press, Inc. (1991) pp. 1-5.
Lin "Pectins." *Food Industry* (1976) 8(4) pp. 18-22.
Sajjaanantakul, T. "Pectinesterase." in *The Chemistry of Technology of Pectin*, Academic Press, Inc. (1991) Chapter 8, pp. 135-150.
Hou, Wen-Chi, et al. "Pectinesterase-Catalyzed Firming Effects During Precooking of Vegetables." *Journal of Food Biochemistry* 20 (1996) pp. 397-416.

* cited by examiner

*Primary Examiner*—Leigh C Maier
(74) *Attorney, Agent, or Firm*—Ladas and Parry LLP

(57) ABSTRACT

This invention relates to a pectin-modified resistant starch prepared by cross-linking starch with pectin by pectinesterase reaction. Such resistant starch is low amylase digestible and thus is useful in food products, including nutritional supplements, to reduce calorie content and increase fiber content. This invention also relates to a composition containing the resistant starch and a process for the preparation of the same.

19 Claims, No Drawings

PECTIN-MODIFIED RESISTANT STARCH, A COMPOSITION CONTAINING THE SAME AND METHOD FOR PREPARING RESISTANT STARCH

FIELD OF THE INVENTION

This invention relates to a pectin-modified resistant starch prepared by cross-linking starch with pectin by pectinesterase reaction so as to reduce the digestibility of the starch.

BACKGROUND OF THE INVENTION

Starch serves as a food reserve in plants and is an important component in the human diet, where the digestion is mediated by α-amylase. Generally, refined starches are quickly and substantially digested by enzymatic hydrolysis and then absorbed by the intestines to serve as the source of energy or be stored in the body. However, some starches resist digestion by α-amylase. Englyst et al. (1992, Eur. J. Clin. Nutr. 46 (suppl 2): S33-S50) classified ingested starches on the basis of their probable digestive rate in vivo. They proposed three classes of dietary starch: 1) rapidly digestible starch (RDS), which is likely to be digested in the human intestines; 2) slowly digestible starch (SDS), which is likely to be slowly yet completely digested in the small intestine; and 3) resistant starch (RS), which is unlikely to be digested in the small intestine.

A need has been recognized for a modified starch to serve as a resistant starch, which provides the consumer with low-calorie carbohydrate product. Such resistant starch would thus be an excellent source of carbohydrate for use in food products, including medical foods and dietary supplements, for both diabetic and prediabetic individuals, or be a choice for healthy individuals in order to reduce the calorie of foods or to slow the rate of starch digestion. Such resistant starch would also be useful for individuals wishing to moderate their glucose response or achieve sustained energy release via consumption of foods.

Literatures demonstrate health-related role for slowly digestible starch, as a result of slow glucose release over an extended period. The benefits include increased satiety for longer periods (which would be useful in weight management), sustained energy release (which is useful in enhancing athletic performance including endurance), and improvements in concentration maintenance and memory.

Such slowly digestible or resistant starch could also be useful as drugs, i.e., as mentioned above, for diabetic or prediabetic individuals to reduce the risk of disease. Moreover, such starch may be useful for the treatment of hyperglycemia, insulin resistance, hyperinsulinemia, dyslipidemia and the like. It may also be useful for the treatment of obesity.

U.S. Pat. No. 6,890,571 discloses a slowly digestible starch product prepared by debranching low amylose starches by isoamylase and allowing the resultant linear short chains to crystallize into a highly crystalline form. U.S. Pat. No. 6,623,943 discloses a process for physically and chemically preparing a resistant starch. The slowly digestible starch of U.S. Pat. No. 6,890,571 and resistant starch of U.S. Pat. No. 6,623,943 are not pectin cross-linked and accordingly, the dietary fiber contents thereof are not as high as that of pectin-modified starch.

The modified starch in U.S. Pat. No. 6,670,470, which is useful in paper coating and sizing, is prepared by oxidizing a starch with hydrogen peroxide, esterifying said oxidized starch and cross-linking the starch. Such chemically-modified starch is not an ideal edible form.

Accordingly, there is a need for modified starches which are slowly digestible or resistant to digestion and are safe to be used in place of or in addition to conventional carbohydrate products in foods or in medical uses.

SUMMARY OF THE INVENTION

This patent pertains to a resistant starch prepared by an enzymatic reaction by pectinesterase to cross-link pectin with starch, both of which are natural and belonging to GRAS (generally recognized as safe) substances. The enzymatic modification changes the physicochemical properties of the starch, and the product is different from the conventional chemically modified starch. The resistant starch has a lower rate of digestion, and thus lowers the rate of glucose release from the carbohydrates derived from the starch. The resistant starch is a natural and safe substance having high dietary fiber contents and can be used as a substitute for natural starch or conventional chemically modified starch. Accordingly, the resistant starch can be used to provide the consumers with a low calorie carbohydrate product resulted from sustained energy release.

The present invention also pertains to a composition comprising a resistant starch prepared by cross-linking starch with pectin by pectinesterase reaction.

This patent also pertains to a process for the preparation of the resistant starch.

DETAILED DESCRIPTION OF THE INVENTION

As used herein, the term "resistant starch" is intended to mean a starch, or the fraction thereof, which is not subject to complete digestion by α-amylase.

As used herein, the term "modified starch" is a starch prepared by treating starch or starch granules, causing the starch to be partially modified in its molecular structure. Modified starch is used in food products as a thickening agent, stabilizer, or an emulsifier. In addition to food product, modified starch is also used in pharmaceuticals.

As used herein, the term "enzymatic reaction" is intended to mean a reaction in which the molecules of the substrates at the beginning of the process are converted into different molecules by reaction catalyzed by the enzyme.

As used herein, the term "pectin" is a family of complex polysaccharides and is a main component in the intercellular layer and cell wall of higher plants. Pectin is particularly prevalent in the cell wall of fruits, especially citrus fruit and apple pomace. Pectin is a heteropolysaccharide and the main structure thereof is polygalacturonide, which is composed of the monomer D-galacturonic acid and linked by α-1,4 glycosidic linkage, among which more than half of the carboxyl groups on the galacturonic acid molecules form methyl ester bonds with methanol. The degree of esterification (DE) of pectin molecules depends on the species, tissues and maturation of the plants, which ranges from about 60 to 90% (Van Buren, 1991, The Chemistry and Technology of Pectin, pp. 1-5).

The degree of esterification or degree of methylation (DM) is defined as the percentage of methylated galacturonic acids to all galacturonic acids in a pectin molecule. Theoretically the degree of esterification can range from 0 to 100%. Pectins with a degree of esterification (DE)>50% are known as high methoxyl pectins (HMP), and consequently low methoxyl pectins (LMP) have a DE<50% (Lin, 1976, Food Industry, 8(4):18-22). The degree of esterification and its charge on the pectin molecules are important to the functional properties of the pectin molecules in the plant cell wall. They also significantly affect the commercial use of pectin preparations as gelling or thickening agents.

Pectinesterase is a kind of pectic enzymes, which exists in a wide variety of roots, stems, leaves, fruits, etc. of higher plants. Pectinesterase can hydrolyze the methyl ester bonds on the sixth carbon of the galacturonic acid residues to produce free carboxyl groups and methanol, and thus lower the degree of esterification of the pectin molecules. In this connection, the pectin with a high degree of esterification may become a pectin or pectic acid with a lower degree of esterification (Sajjaanantakul and Pitifer, 1991, The Chemistry and Technology of Pectin, pp. 135-150). Pectins having a DE value of about 60% are easily obtainable from natural plant sources. Most commercial pectins with a DE value of about 30% are made by partial deesterification of natural pectins.

Hydrolysis and transacylation reaction may occur in the reaction of pectin catalyzed by pectinesterase. In the hydrolysis reaction, pectin molecules loose parts of the methoxyl groups to form pectic acids and free methanol; and in the transacylation reaction, some acyl groups on the pectin molecule combine with pectinesterase molecule to form an intermediate by the first-step transacylation reaction, and then the intermediate undergoes another transacylation reaction with the hydroxyl group on another pectin molecule, or some other acceptor molecules such as starch, to cross-link each other. The scheme of the reactions is shown below (Hou and Chang, 1996. J. Food Biochem. 20:397-416.)

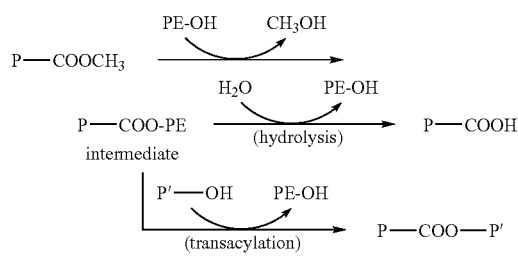

As used herein, the term "transacylation" means a chemical reaction involving the transfer of an acyl group. Pectinesterase catalyzes not only the hydrolysis of the methoxyl groups of pectin molecules, but also a transacylation reaction in which the galacturonic acyl groups are transferred to other hydroxyl groups of either pectin or other carbohydrate molecules such as starch.

An enzymatically modified starch is provided in the subject invention, which has low calorie and high fiber contents. The modified starch is prepared by an enzymatic reaction between starch and pectin with pectinesterase so as to result in a transacylation reaction between them to cross-link the starch with pectin. The enzymatically modified starch exhibits resistance to α-amylase digestion. α-Amylase digestion is measured by adding both α-amylase and glucoamylase into the diluted test samples of starch or modified starch, and determining the free glucose concentration of the solution after incubation for a certain period.

Virtually any starch can be modified according to the method described herein, including cereal starch, root starch, tuber starch, legume starch, high amylose starch and low amylose starch. The sources of the starch include wheat, maize, rice, oat, tapioca, mung bean, potato, sago, sweet potato, barley, triticale, sorghum, banana and other plant sources. Physically, chemically or genetically modified forms of starch can also be used. Modification techniques include (1) physical transformations such as retrogradation (recrystallization), heat treatment, partial gelatization, annealing and roasting; (2) treatment with chemicals and/or enzymes; (3) genetic modifications including gene or chromosome engineering, such as cross-breeding, translocation, inversion and transformation; and (4) combinations of the above.

The modified resistant starch of the invention is made by a process involving first forming a solution comprising starch and pectin. Any technology known for forming the solution comprising starch and pectin can be applied to the present invention. In a preferred embodiment of the present invention, the solution comprising starch and pectin can be prepared by the following steps:

(i) premixing the starch with a solvent selected from water and an ethanol solution to obtain a mixture;
(ii) adding water or an alkaline solution to the mixture to obtain a starch suspension;
(iii) heating the starch suspension to dissolve the starch and obtain a starch solution;
(iv) adding water and pectin into the starch solution to obtain a starch-pectin suspension; and
(v) heating the starch-pectin suspension to dissolve the pectin and obtain a solution comprising starch and pectin.

In step (i), the volume/weight ratio of the solvent to the starch is about 60:1, preferably about 20:1. If the ethanol solution is used as the solvent, the ethanol solution can be any concentration, preferable about 60% to 95%, and most preferable about 95%. The volume ratio of the water/alkaline solution added in step (ii) to the solvent used in step (i) is about 3:1, preferably about 5:1. According to the present invention, the alkaline solution used includes, but are not limited to, sodium hydroxide solution, potassium hydroxide solution, sodium carbonate solution and sodium bicarbonate solution. In step (iii), the heating is conducted at a temperature of about 60 to 100° C. for about 5 to 60 minutes, more preferably at a temperature of about 80 to 100° C. for about 5 to 30 minutes, and most preferably at a temperature of about 90 to 100° C. for about 5 to 10 minutes. The volume ratio of water added in step (iv) to the water/alkaline solution added in step (ii) is about 3:1, preferably about 7:1. In step (v), the heating is conducted at a temperature of about 60 to 100° C. for about 10 to 60 minutes, more preferably at a temperature of about 80 to 100° C. for about 10 to 45 minutes, and most preferably at a temperature of about 90 to 100° C. for about 10 to 30 minutes. In a most preferred embodiment of the invention, ethanol and/or alkaline solution are used to facilitate the dissolution of pectin and to accelerate the subsequent cross-linking reaction.

Pectinesterase is then added to the solution comprising starch and pectin to affect transacylation of the pectin and cross-linking the starch with pectin. A further step of shaking may be applied to the solution comprising starch and pectin to facilitate the enzymatic reaction.

The rate of enzymatic reaction depends upon factors known in the art, including the concentration of the enzyme, the concentration of the substrate, the pH of the reaction mixture, the temperature, and the degree of modification to be achieved, if any.

The pH and temperature of the solution used in the present invention should allow pectinesterase to effectively provide enzymatic reaction. In general, a temperature of about 20 to 80° C. is used, particularly about 25 to 60° C. In general, the pH is adjusted to about 4.0 to 9.0, particularly about 6.0 to 8.0, using techniques known in the art.

The enzymatic reaction is carried out in an aqueous solution. Generally, the weight ratio of starch and pectin in the solution comprising starch and pectin is about 20:1, preferably about 10:1, and most preferably 1:1. The amount of pectinesterase added is about 1 to 30 Units per ml of the final solution, preferably about 1 to 10 Units per ml of the final solution.

The enzymatic reaction is continued until the resistant starch is obtained, and the duration thereof depends upon the desired level of modification of the starch. The time of reaction also depends upon the types of starch and pectin used, especially the degree of esterification of pectin, and the reaction parameters, such as pH and temperature. In general, the enzymatic reaction takes about 0.5 to 120 hours, more preferably about 1 to 96 hours.

Pectins of all degrees of esterification can be applied to the present invention. However, the higher the degree of esterification of pectin, the higher the potential of the reaction to produce resistant starch. In one embodiment, pectins having a degree of esterification higher than 30% are subjected to the enzymatic reaction. In a preferred embodiment, pectins having a degree of esterification higher than 60% are used in the enzymatic reaction.

The products in the solution are then optionally recovered by centrifuging and then drying the precipitate in a conventional oven, hydrothermal heater, spray cooker and/or spray drier to obtain a solid product.

The resistant starch of the present invention may also be further modified, either before or after the cross-linking of pectin with starch. Such modification may be any of the physical, enzymatic or chemical modifications known in the art.

The resistant starch disclosed herein may be used in a composition, such as a food composition, having high dietary fiber, low fat and/or low calorie content. For example, the resistant starch may be incorporated into food products including, but not limited to, cookies, biscuits, breads, pizza, puddings, pasta, noodles, ice cream, yogurts, cakes and the like. Incorporation of the resistant starch into food products fulfills dietary fiber requirements of finished products. The modified starch may be incorporated at a level determined by skilled artisans to produce food with a reduced calorie content.

In addition to food compositions, the resistant starch can be applied to nutritional foods and beverages, including dietary supplements, diabetic food and beverage products, and the like.

The resistant starch may be added at any amount desired or necessary to obtain the functionality of the composition. In general, the starch may be added in an amount of about 0.01 to 100%, particularly about 1 to 50%, by weight of the composition. The resistant starch may be added to foods or beverages in the same manner as any other starch, typically by mixing directly into the products or adding it to an aqueous solution.

The following examples set forth particular enzymatically modified resistant starch in accordance with the instrumentalities reported herein, as well as methods of preparing such modified starch. It is to be understood that these examples are provided by way of illustration only, and nothing therein should be taken as a limitation on the scope of what has been invented, which is defined by the claims that follow.

EXAMPLES

Example 1

Pectin-Modified Amylose

1. Preparation of the Samples
   (1) Amylose solution (Amylose, A)
       Amylose (50 mg, Type III, from potato, Sigma Chemical Co., Germany) was premixed with 1 ml of ethanol (95%) in a round-bottom flask, and then 5 ml of sodium hydroxide solution (0.5N) was added into the flask. The amylose in the suspension was dissolved by heating at 95° C. for 5 minutes and then deionized water (Milli-QPF Plus, 16.7 to 18 megaohm/cm, Millipore, France) was added to the solution to a final volume of 50 ml.
   (2) Solution comprising amylose and pectin (Amylose+Pectin, AP)
       Amylose (50 mg) was premixed with 1 ml of ethanol (95%) in a round-bottom flask, and then 5 ml of sodium hydroxide solution (0.5N) was added into the flask. The amylose in the suspension was dissolved by heating at 95° C. for 5 minutes and then deionized water was added to the solution to a volume of 40 ml. Pectin (50 mg, from apple, DE>60, Sigma Chemical Co., Germany) was added to the solution. Pectin in the solution was dissolved by heating at 95° C. for 20 minutes and then deionized water was added to the solution to a final volume of 50 ml.
   (3) Mixed solution of amylose, pectine and pectinesterase (Amylose+Pectin+Pectinesterase, APE)
       Amylose (50 mg) was premixed with 1 ml of ethanol (95%) in a round bottom flask, and then 5 ml of sodium hydroxide solution (0.5N) was added into the flask. The amylose in the suspension was dissolved by heating at 95° C. for 5 minutes and then deionized water was added to the solution to a volume of 40 ml. Pectin (50 mg) was added to the solution and then dissolved by heating at 95° C. for 20 minutes. The pH of the solution was adjusted to about 7.5 by adding 0.1 N hydrochloric acid solution (37%, Merck, Germany). Pectinesterase (801 Unit/ml, 0.1 ml, EC 3.1.1.11, from orange peel, Sigma Chemical Co., Germany) and deionized water were added to the solution to a final volume of 50 ml. The mixture was shaken at a rate of 150 rpm for 24 to 72 hours.

2. Digestion Rate Test
   Deionized water was added to each sample prepared above to a volume of 250 ml and the pH of each solution was then adjusted to about 5.8 to 6.5. Thermally stable ($\alpha$-amylase (13000 Lj/g, 0.1 ml, KLEISTASE T10S, DAIWA KASEI K. K., Japan) was added to each solution and the solutions were heated in a water bath of 100° C. for 5 minutes to conduct the enzymatic reaction. After the reaction, the pH of the solutions was adjusted to about 4 and then deionized water was added to each solution to a volume of 250 ml. Glucoamylase (225 GAU/ml, 0.3 ml, OPIMAX 7525HP, Genencor Division, Danisco US, Inc., U.S.A.) was then added to each solution to react with the substrate for 10 minutes in a water bath of 55 to 60° C. Deionized water was again added to each solution to a volume of 2000 ml. The concentration of glucose in each solution was determined by using RQ Flex® plus test strip (Merck, Germany). The concentration of glucose in each sample was calculated by multiplying the value read in the test strip with the fold of dilution. The digestion rate of each sample was calculated according to the following equation and the results are shown in Table 1.

$$\text{Digestion rate} = \frac{\text{concentration of glucose in the sample}}{\text{concentration of glucose in amylose solution}} \times 100\%$$

TABLE 1

Digestion rate of the samples

|  | A | AP | APE |
|---|---|---|---|
| Digestion rate (%) | 100 | 92.8 ± 6.1 | 34.8 ± 4.0 |

A: amylose
AP: amylose + pectin
APE: amylose + pectin + pectinesterase

Example 2

Pectin-Modified Wheat Starch

1. Preparation of Samples (1) Wheat starch solution (Wheat Starch, S)

Wheat starch (50 mg, Prime grade A1, Cropstar, Australia) was premixed with 1 ml of water in a round-bottom flask, and then 5 ml of sodium hydroxide solution (0.5N) was added into the flask. The wheat starch in the suspension was dissolved by heating at 95° C. for 5 minutes and then deionized water was added to the solution to a volume of 40 ml. The pH of the solution was adjusted to about 7.5. Deionized water was added to the solution to a final volume of 50 ml. The solution was kept at 30° C. for 1 hour before use.

(2) Mixed solution of wheat starch and pectin (Wheat Starch+Pectin, SP)

(i) Heat and alkali treatment

Wheat starch (50 mg, Prime grade A1, Cropstar, Australia) was premixed with 1 ml of water in a round-bottom flask, and then 5 ml of sodium hydroxide solution (0.5N) was added into the flask. The wheat starch in the suspension was dissolved by heating at 95° C. for 5 minutes and then deionized water was added to the solution to a volume of 40 ml. Pectin (50 mg, from apple, DE>60, Sigma Chemical Co., Germany) was added into the solution and dissolved by heating at 95° C. for 20 minutes, and then deionized water was added to the solution to a volume of 40 ml. The pH of the solution was adjusted to about 7.5. Deionized water was added to the solution to a final volume of 50 ml. The solution was kept at 30° C. for 1 hour before use.

(ii) Heat treatment

Wheat starch (50 mg) was premixed with 1 ml of water in a round-bottom flask, and then 5 ml of water was added into the flask. The wheat starch in the suspension was dissolved by heating at 95° C. for 5 minutes and then deionized water was added to the solution to a volume of 40 ml. Pectin (50 mg) was added to the solution and dissolved by heating at 95° C. for 20 minutes. The pH of the solution was adjusted to about 7.5. Deionized water was added to the solution to a final volume of 50 ml. The solution was kept at 30° C. for 1 hour before use.

(3) Mixed solution of wheat starch, pectin and pectinesterase (Wheat Starch+Pectin+Pectinesterase, SPE)

(i) Heat and alkali treatment

Wheat starch (50 mg) was premixed with 1 ml of water in a round-bottom flask, and then 5 ml of sodium hydroxide solution (0.5N) was added into the flask. The wheat starch in the suspension was dissolved by heating at 95° C. for 5 minutes and then deionized water was added to the solution to a volume of 40 ml. Pectin (50 mg) was added to the solution and dissolved by heating at 95° C. for 20 minutes. The pH of the solution was adjusted to about 7.5. Deionized water was added to the solution to a final volume of 50 ml. Pectinesterase (801 Unit/ml, 0.1 ml) was added to the solution. The solution was kept at 30° C. for 1 hour before use.

(ii) Heat treatment

Wheat starch (50 mg) was premixed with 1 ml of water in a round-bottom flask, and then 5 ml of water was added into the flask. The wheat starch in the suspension was dissolved by heating at 95° C. for 5 minutes and then deionized water was added to the solution to a volume of 40 ml. Pectin (50 mg) was added to the solution and dissolved by heating at 95° C. for 20 minutes. The pH of the solution was adjusted to about 7.5. Deionized water was added to the solution to a final volume of 50 ml. The solution was kept at 30° C. for 1 hour before use. Pectinesterase (801 Unit/ml, 0.1 ml) was added to the solution. The solution was kept at 30° C. for 1 hour before use.

2. Digestion rate test

Deionized water was added into each sample prepared above to a volume of 250 ml and the pH of each solution was then adjusted to about 5.8 to 6.5. Thermally stable α-amylase (13000 Lj/g, 0.1 ml) was added to each solution and the solutions were heated in a water bath of 100° C. for 5 minutes to conduct the enzymatic reaction. After the reaction, the pH of the solutions was adjusted to about 4 and then deionized water was added to each solution to a volume of 250 ml. Glucoamylase (225 GAU/ml, 0.3 ml) was then added to each solution to react with the substrate for 10 minutes in a water bath of 55 to 60° C. Deionized water was again added to each solution to a volume of 2000 ml. The concentration of glucose in each solution was determined by using RQ Flex® plus test strip. The concentration of glucose in each sample was calculated by multiplying the value read in the test strip with the fold of dilution. The digestion rate of each sample was calculated according to the following equation and the results are shown in Table 2.

$$\text{Digestion rate} = \frac{\text{concentration of glucose in the sample}}{\text{concentration of glucose in wheat starch solution}} \times 100\%$$

TABLE 2

| | Digestion rate of the sample | | | |
|---|---|---|---|---|
| | | SP | | SPE |
| | S | HA treatment | H treatment | HA treatment | H treatment |
| Digestion rate (%) | 100 | 100 | 100 | 73.3 ± 5.8 | 75.8 ± 9.0 |

S: wheat starch
SP: wheat starch + pectin
SPE: wheat starch + pectin + pectinesterase
HA treatment: heat and alkali treatment
H treatment: heat treatment

What is claimed is:

1. A resistant starch prepared by cross-linking starch with pectin by pectinesterase reaction.

2. A composition comprising the resistant starch of claim 1.

3. The composition according to claim 2, which is a food composition or a pharmaceutical composition.

4. A process for the preparation of a resistant starch comprising:
   (a) preparing a solution comprising starch and pectin; and
   (b) cross-linking starch with pectin by pectinesterase reaction.

5. The process of claim 4, wherein the cross-linking reaction in step (b) is conducted at a temperature of about 20 to 80° C.

6. The process of claim 4, wherein the cross-linking reaction in step (b) is conducted at a pH of about 4.0 to 9.0.

7. The process of claim 4, wherein the solution comprising starch and pectin is prepared by:
   (i) premixing the starch with a solvent selected from water and an ethanol solution to obtain a mixture;
   (ii) adding water or an alkaline solution to the mixture to obtain a starch suspension;
   (iii) heating the starch suspension to dissolve the starch and obtain a starch solution;
   (iv) adding water and pectin to the starch solution to obtain a starch-pectin suspension; and
   (v) heating the starch-pectin suspension to dissolve the pectin and obtain a solution comprising starch and pectin.

8. The process of claim 7, wherein the solvent used in step (i) is ethanol solution.

9. The process of claim 8, wherein the concentration of the ethanol solution is about 95%.

10. The process of claim 7, wherein the alkaline solution is added in step (ii).

11. The process of claim 7, wherein the heating in step (iii) is conducted at a temperature of about 60 to 100° C. for about 5 to 60 minutes.

12. The process of claim 7, wherein the pectin has a degree of esterification (DE) value higher than 30.

13. The process of claim 12, wherein the pectin has a DE value higher than 60.

14. The process of claim 7, wherein the heating in step (v) is conducted at a temperature of about 60 to 100° C. for about 10 to 60 minutes.

15. The process of claim 7, which further comprises step (vi) for recovering the resistant starch by centrifugation.

16. The process of claim 15, which further comprises step (vii) for drying the recovered resistant starch.

17. A resistant starch prepared by the process according to claim 4.

18. A composition comprising the resistant starch of claim 17.

19. The composition according to claim 18, which is a food composition or a pharmaceutical composition.

* * * * *